US011897753B2

United States Patent
Iwanaga

(10) Patent No.: US 11,897,753 B2
(45) Date of Patent: Feb. 13, 2024

(54) DISPENSER AND COCK

(71) Applicant: Kagura Feast Corp., Fukuoka (JP)

(72) Inventor: Mitsuhiro Iwanaga, Fukuoka (JP)

(73) Assignee: Kagura Feast Corp.

(*) Notice: Subject to any disclaimer, the term of this patent is extended or adjusted under 35 U.S.C. 154(b) by 122 days.

(21) Appl. No.: 17/263,024

(22) PCT Filed: Jul. 26, 2018

(86) PCT No.: PCT/JP2018/028069
§ 371 (c)(1),
(2) Date: Jan. 25, 2021

(87) PCT Pub. No.: WO2020/021676
PCT Pub. Date: Jan. 30, 2020

(65) Prior Publication Data
US 2021/0139310 A1  May 13, 2021

(51) Int. Cl.
*B65D 3/00* (2006.01)
*B67D 3/00* (2006.01)
*B67D 3/04* (2006.01)

(52) U.S. Cl.
CPC .......... *B67D 3/0058* (2013.01); *B67D 3/047* (2013.01); *B67D 2210/00141* (2013.01)

(58) Field of Classification Search
CPC ............. E03C 2001/0414; E03C 1/023; E03C 2201/30; F16K 2200/501; F16K 19/006;
(Continued)

(56) References Cited

U.S. PATENT DOCUMENTS 2,979,239 A * 4/1961 Collins ................ B65D 47/122
222/530
3,308,224 A * 3/1967 Waddington ........... B67D 3/047
264/249
(Continued)

FOREIGN PATENT DOCUMENTS

CN        2417340 Y    1/2001
CN        2489151 Y    5/2002
(Continued)

OTHER PUBLICATIONS

Kagura Feast Corp; Extended European Search Report for application No. 18927550.6, dated Feb. 9, 2022, 9 pgs.
(Continued)

*Primary Examiner* — Paul R Durand
*Assistant Examiner* — Randall A Gruby
(74) *Attorney, Agent, or Firm* — Taylor English Duma LLP

(57) ABSTRACT

A dispenser for discharging beverage can comprise a cock configured to control discharge of the beverage; a lever connected to a rotary shaft of the cock; a rotary valve connected to the rotary shaft and defining a rotary interspace configured to rotate together with the rotary shaft; and a fixed valve fixed to a cock body of the cock and defining a fixed hole configured to not move even when the rotary shaft is rotated; wherein the dispenser is configured to discharge the beverage when the lever is rotated to overlap a position of the rotary interspace and the fixed hole; and wherein the cock is configured to fix the fixed valve at one of a first position and a second position, the second position being different from the first position.

8 Claims, 8 Drawing Sheets

(58) Field of Classification Search
CPC .............. F16K 31/605; Y10T 137/5196; Y10T 137/5283
USPC ........................................................ 222/542
See application file for complete search history.

(56) References Cited

U.S. PATENT DOCUMENTS

| | | | | |
|---|---|---|---|---|
| 3,453,033 | A * | 7/1969 | Goss | B67D 3/00 220/663 |
| 3,476,138 | A * | 11/1969 | Doremus | F16K 35/00 251/352 |
| 4,549,579 | A * | 10/1985 | Bergmann | F16K 3/085 137/625.21 |
| 4,651,770 | A * | 3/1987 | Denham | F16K 3/08 137/625.31 |
| 4,674,537 | A * | 6/1987 | Bergmann | F16K 3/085 251/208 |
| 4,821,764 | A | 4/1989 | Brenez | |
| 4,821,765 | A * | 4/1989 | Iqbal | F16K 3/08 251/288 |
| 4,932,561 | A * | 6/1990 | Boxall | B67D 1/0858 222/638 |
| 5,071,042 | A * | 12/1991 | Esposito | B65D 25/48 222/542 |
| 5,107,884 | A | 4/1992 | Orlandi | |
| 5,127,438 | A * | 7/1992 | Williams | F16K 27/045 285/193 |
| 5,398,717 | A * | 3/1995 | Goncze | F16K 3/08 251/288 |
| 5,444,992 | A * | 8/1995 | Bell | F25D 3/08 62/530 |
| 5,673,817 | A * | 10/1997 | Mullen | B65D 77/06 222/105 |
| 5,681,028 | A * | 10/1997 | Cook | F16K 27/045 251/192 |
| 5,732,734 | A * | 3/1998 | Buccicone | F16K 27/045 137/454.6 |
| 5,881,999 | A * | 3/1999 | Chen | F16K 3/085 251/352 |
| 5,890,629 | A * | 4/1999 | Loew | B67D 3/0035 222/144.5 |
| 5,904,336 | A * | 5/1999 | Niakan | F16K 3/08 251/208 |
| 6,029,699 | A * | 2/2000 | Granot | E03C 1/0404 137/607 |
| 6,158,623 | A * | 12/2000 | Benavides | B65D 83/06 222/129 |
| 6,220,294 | B1 * | 4/2001 | Ko | F16K 3/36 137/625.31 |
| 6,237,622 | B1 * | 5/2001 | Cook | G05D 23/1313 137/454.6 |
| 6,334,329 | B1 * | 1/2002 | Weller | B67D 3/0083 62/396 |
| 6,394,127 | B1 * | 5/2002 | Creswell | B01D 35/04 137/625.46 |
| 6,820,772 | B1 * | 11/2004 | Bennett, Jr. | B67D 3/048 222/325 |
| 6,941,968 | B2 * | 9/2005 | Vidal | E03C 1/04 137/544 |
| 7,137,533 | B1 * | 11/2006 | Heath | B67D 3/0029 248/133 |
| 7,258,252 | B2 * | 8/2007 | Waters | B67D 1/04 222/190 |
| 7,607,639 | B2 * | 10/2009 | Chen | F16K 27/045 251/208 |
| 8,333,302 | B2 | 12/2012 | Fukunaga | |
| 8,613,293 | B2 * | 12/2013 | Bolgar | F16K 11/0743 137/625.46 |
| 8,689,830 | B2 * | 4/2014 | Chen | E03C 1/0412 251/208 |
| 8,714,520 | B2 * | 5/2014 | Sun | F16K 25/005 251/208 |
| 8,733,594 | B1 * | 5/2014 | White | B67D 3/0083 222/105 |
| 9,016,525 | B2 * | 4/2015 | Henderson | B67D 3/0035 222/185.1 |
| 10,487,952 | B2 * | 11/2019 | Chen | F16K 11/0743 |
| 10,487,953 | B2 * | 11/2019 | Chen | F16K 11/0743 |
| 10,563,781 | B2 * | 2/2020 | Chen | F16K 11/0743 |
| 11,434,124 | B2 * | 9/2022 | Bhutani | B67D 1/08 |
| 2004/0182457 | A1 | 9/2004 | Vidal | |
| 2005/0023292 | A1 * | 2/2005 | Market | A45F 3/20 222/105 |
| 2005/0151106 | A1 * | 7/2005 | He | F16K 3/08 137/625.46 |
| 2006/0016001 | A1 * | 1/2006 | Zhao | F16K 11/072 4/675 |
| 2007/0045339 | A1 * | 3/2007 | Manion | B67D 1/0001 222/386.5 |
| 2007/0251955 | A1 * | 11/2007 | Green | B67D 3/0035 222/185.1 |
| 2008/0224080 | A1 | 9/2008 | Miller | |
| 2010/0314416 | A1 * | 12/2010 | Wezner | B67D 3/0083 222/192 |
| 2012/0055955 | A1 | 3/2012 | Fukunaga | |
| 2012/0273075 | A1 | 11/2012 | Pitsch et al. | |
| 2013/0233890 | A1 * | 9/2013 | Melzer | C02F 1/003 222/189.06 |
| 2014/0325752 | A1 * | 11/2014 | Tuineag | F16K 11/065 4/675 |
| 2018/0003303 | A1 | 1/2018 | Peirsman et al. | |
| 2018/0258621 | A1 * | 9/2018 | Binay Kumar | F16K 11/20 |

FOREIGN PATENT DOCUMENTS

| | | |
|---|---|---|
| CN | 101258097 A | 9/2008 |
| CN | 102421696 | 4/2012 |
| CN | 104061344 A | 9/2014 |
| CN | 104105911 A | 10/2014 |
| CN | 106352101 A | 1/2017 |
| CN | 107207237 A | 9/2017 |
| CN | 207064685 U | 3/2018 |
| EP | 0443300 | 8/1991 |
| EP | 2426082 | 3/2012 |
| GB | 2229417 | 9/1990 |
| JP | S518536 | 1/1976 |
| JP | S5426493 | 9/1979 |
| JP | 3209071 | 9/1991 |
| JP | H0622670 | 3/1994 |
| JP | 2570739 | 5/1998 |
| JP | 5043231 | 10/2012 |
| KR | 20120018163 | 2/2012 |
| KR | 101287909 | 7/2013 |
| RU | 2485045 | 6/2013 |
| WO | 2010125684 | 10/2012 |

OTHER PUBLICATIONS

Iwanaga, Mitsuhiro; International Search Report and Written Opinion for PCT/JP2018/028069, filed Jul. 26, 2018, dated Oct. 23, 2018, 11 pgs.

Kagura Feast Corp.; Office Action for Chinese patent application No. 201880095970.0, dated Apr. 25, 2022, 13 pgs.

* cited by examiner

DISPENSER AND COCK

TECHNICAL FIELD

This invention relates to a dispenser which discharges beverage, and a cock which is connected to a dispenser and which controls discharge of beverage.

BACKGROUND ART

In general, dispensers which discharge beverage have been provided in large sizes for installation in a store, but there is a need to enjoy beverage such as wine by a dispenser at home, too.

The applicant has developed a wine dispenser in order to meet such needs, and obtained patents not only in Japan but also in countries of Europe, United States and Asia (Patent Document 1 or the like). Mitsuhiro Co., Ltd. was the applicant related to the Patent Document 1 or the like and is a group company of the applicant of the present application.

PRIOR ART LITERATURE

Patent Document

Patent Document 1: Japanese Patent No. 5043231
Patent Document 2: American U.S. Pat. No. 8,333,302
Patent Document 3: Russian Patent No. 2485045
Patent Document 4: Korean Patent No. 101287909
Patent Document 5: European Patent No. 2426082

SUMMARY OF THE INVENTION

Problem Solved by the Invention

However, in order to be used at home, because there is less space at home than in a store, a dispenser should be developed in that it should be able to be stored in a less space.

For example, when a dispenser containing beverage is to be stored in a home refrigerator, a large dispenser or a structurally bulky dispenser is difficult to be stored, and such dispensers are not convenient to be used.

The purpose of the present invention is, therefore, to provide a dispenser or the like that enables storage occupying a space less space than conventional ones.

Means for Solving the Problem

The first aspect of the present invention is a dispenser which discharges beverage, comprising a cock which controls discharge of beverage, a lever connected to a rotary shaft of the cock, a rotary valve connected to the rotary shaft and having a rotary interspace which rotates together with rotation of the rotary shaft, and a fixed valve fixed to a cock body of the cock and having a fixed hole which does not move even when the rotary shaft is rotated, wherein the dispenser discharges the beverage when the lever is rotated to overlap the positions of rotary interspace and the fixed hole, and wherein the cock fixes the fixed valve at a first position or fixes the fixed valve at a second position different from the first position.

The second aspect of the present invention is the dispenser of the first aspect, wherein the second position is a position rotated around the rotary shaft from the first position.

The third aspect of the present invention is the dispenser of the first or second aspect, wherein the fixed valve has a first lug part and a second lug part, and wherein the cock body has a first groove, a second groove, a third groove and a fourth groove, and wherein the cock body fixes the fixed valve in a first position by fixing the first lug part and the second lug part at the first groove and the second groove, respectively, or, wherein the cock body fixes the fixed valve in a second position by fixing the first lug part and the second lug part at the third groove and the fourth groove, respectively.

The fourth aspect of the present invention is the dispenser of any one of the first through third aspects, wherein the cock further has a cylindrical packing inside, and wherein the packing has a lower inner diameter which is an inner diameter at a lower part near discharge side and an upper inner diameter which is an inner diameter at an upper part far from the discharge side, and the lower inner diameter is smaller than the upper inner diameter.

The fifth aspect of the present invention is the dispenser of the fourth aspect, wherein the packing has a groove in an inside diameter direction between the upper part and the lower part.

The sixth aspect of the present invention is the dispenser of any one of the first through the fifth aspects, wherein direction in which the cock discharges the beverage is fixed so as to be inclined by 3 degrees or more and 25 degrees or less with respect to the vertical direction when the dispenser is horizontally placed.

The seventh aspect of the present invention is the dispenser of any one of the first through the sixth aspects, wherein the cock body includes, a connection pipe connected to a container part which contains the beverage, and a discharge pipe which is connected to the connection pipe and which holds the rotary shaft, wherein, when the dispenser is horizontally placed, an end of the connection pipe, connected to the container, is fixed at a position higher than an end of the connection pipe, connected to the discharge pipe.

The eighth aspect of the present invention is a cock which controls discharge of beverage and which is connected to a dispenser which discharges beverage, comprising, a lever connected to a rotary shaft of the cock, a fixed valve fixed to a cock body of the cock and having a fixed hole, and a rotary valve connected to the rotary shaft and having a rotary interspace, wherein the dispenser discharges the beverage when the lever is rotated to overlap the positions of rotary interspace and the fixed hole, and wherein the cock fixes the fixed valve at a first position or fixes the fixed valve at a second position different from the first position.

Effect of the Invention

According to each aspect of the present invention, in use, the lever can be closed at a position where the lever is easily taken up. And when the dispenser is stored, the lever can be closed at a position where the lever does not interfere with the storage. At the time of use, the lever is easy to use if the lever is directed toward the user, but when the dispenser is to be housed in the door pocket of the refrigerator, for example, the lever collides against the wall of the refrigerator and the food or the like to become a hindrance to the storage. Further, food or the like is damaged. Besides, when the lever collides with the food or the like and rotates in the refrigerator, much beverage can be spilled into the refrigerator. Therefore, the dispenser can be stably housed by making it possible to close the dispenser in different directions of the lever between in use and the time of housing.

In particular, according to the second and the third aspects of the present invention, only by slightly moving the fixed position of the fixed valve by disassembling the cock after the use, the lever can be stored in a place such as a door pocket of the refrigerator without obstructing the storage. If the fixed valve only has to be fixed to the cock, only two grooves are enough. This configuration is characteristic of the present invention based on the finding that it is meaningful to fix the fixed valve by repositioning between at the time of use and the time of housing. The cock can be disassembled without a tool.

Further, according to the fourth aspect of the present invention, the liquid pool and liquid leakage at the tip of the cock to be a large problem can be suppressed. Because the leakage of the liquid like wine can cause a stain hard to be washed off, the leakage from the tip of the cock may force much stress on the user. The constitution of this aspect which suppresses liquid accumulation and liquid leakage is epoch-making as a dispenser.

Further, according to the fifth aspect of the present invention, by allowing the beverage to enter the groove inside the packing, it is further easy to suppress liquid accumulation and liquid leakage at the tip of the cock. Here, when the pressure of the beverage on the cock is high, the pressure exerted by the rotary valve and the fixed valve to each other should be appropriately adjusted to prevent the occurrence of liquid leakage. The groove of the packing can absorb the pressure exerted on each other by the rotary valve and the fixed valve due to the individual difference of the cock. Then, it is also easy to automatically adjust the load for the rotary shaft to rotate. By constituting the packing of flexible material such as silicone rubber, the effectiveness of the packing is expected to be further enhanced.

Further, according to the sixth aspect of the present invention, when wine is discharged, for example, the wine hits the curved side surface of the wine glass naturally and the wine can be smoothly and visually beautifully contained in the wine glass. If the inclination is smaller than the angle range, the wine does not hit the side surface of the wine glass. And if the inclination is larger than the angle range, the inclination direction of the cock and the discharge direction of the wine are too different. Then, the appearance of the discharge is impaired. It is also easy to prevent the liquid from being accumulated at the tip of the cock.

Further, according to the seventh aspect of the present invention, it is easy to discharge all the beverage so as not to stay in the route in the cock.

BRIEF DESCRIPTION OF THE DRAWINGS

FIG. 7A is a bottom perspective view showing the closing state of the cock part with the lever turned toward the front.

FIG. 7B is a bottom perspective view showing the opening state of the cock part with the lever turned sideways.

FIG. 7C is a bottom perspective view showing the closing state with the lever turned sideways.

FIG. 7D is a bottom perspective view showing the opening state with the lever turned toward the front.

FIG. 8A is a top perspective view of the grooved packing.

FIG. 8B is a side perspective view of the grooved packing.

FIG. 8C is a bottom view of the grooved packing.

FIG. 8D is a sectional view showing the grooved packing along line 8D-8D of FIG. 8A.

FORM FOR CARRYING OUT THE INVENTION

Embodiments of the present invention will be described below with reference to the drawings. The embodiments of the present invention are not limited to the following examples.

Example

Figure 1:
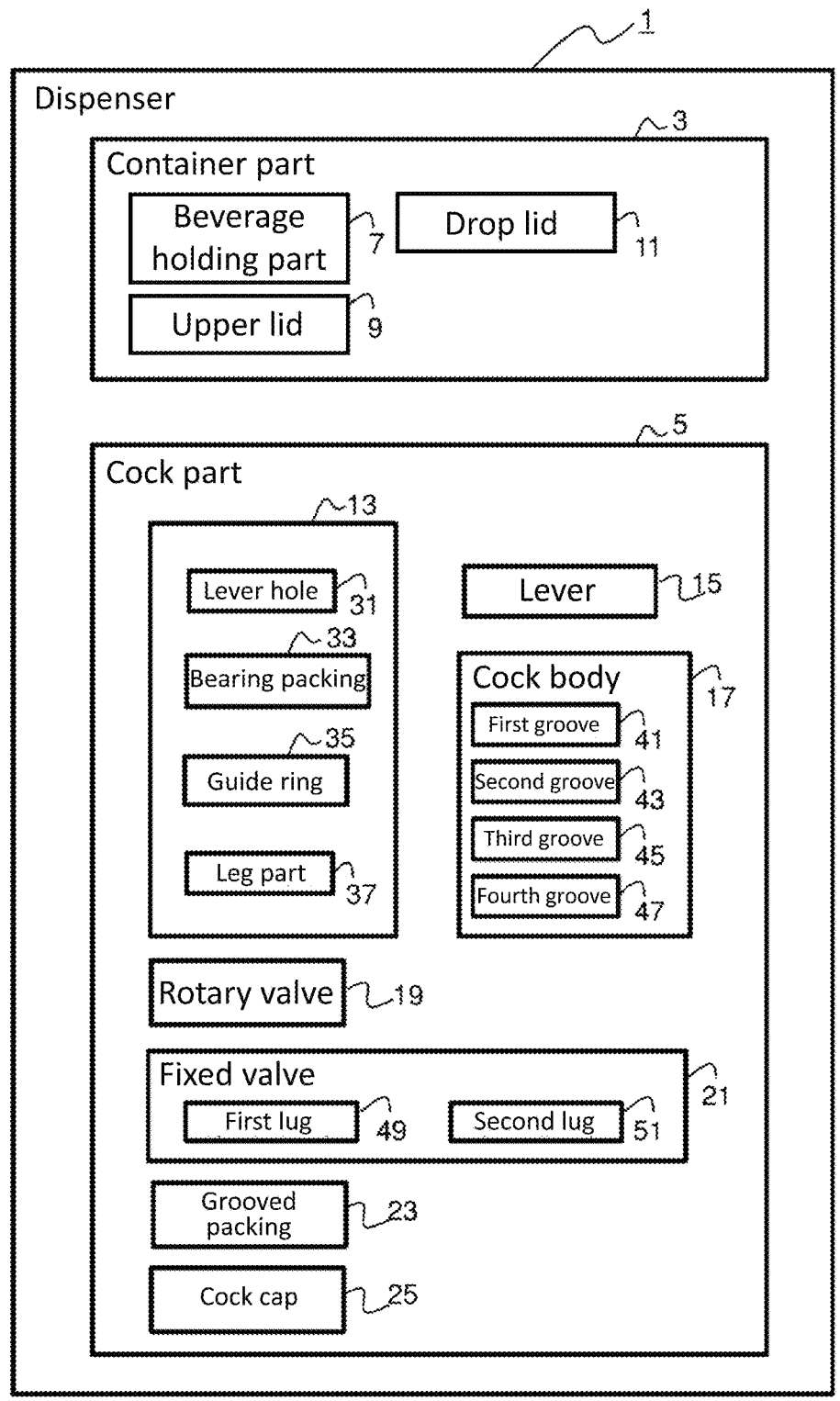
FIG. 1 is a block diagram showing an outline of a dispenser related to the present invention.

FIG. 1 is a block diagram showing an outline of a dispenser 1 (one example of a "dispenser" in claims) related to an embodiment of the present invention. Referring to FIG. 1, the dispenser 1 includes a container part 3 and a cock part 5 (one example of a "cock" in claims). The container part 3 has a beverage holding part 7, an upper lid 9, and a drop lid 11. The cock part 5 has a rotary shaft 13 (one example of a "rotary shaft" in claims), a lever 15 (one example of a "lever" in claims), a cock body 17 (one example of a "cock body" in claims), a rotary valve 19 (one example of a "rotary valve" in claims), a fixed valve 21 (one example of a "fixed valve" in claims), a grooved packing 23 (one example of a "packing" in claims), and a cock cap 25. The rotary shaft 13 has a lever hole 31, a bearing packing 33, a guide ring 35, and a leg part 37. The cock body 17 is made of stainless steel, and has a first groove 41 (one example of a "first groove" in claims), a second groove 43 (one example of a "second groove" in claims), a third groove 45, and a fourth groove 47 (one example of a "fourth groove" in claims). The fixed valve 21 has a first lug part 49 (one example of a "first lug part" in claims) and a second lug part 51 (one example of a "second lug part" in claims). A plurality of the same kinds of sites may be indicated by adding a suffix to a sign, but the subscript may be omitted in the case of referring collectively.

Figure 2:
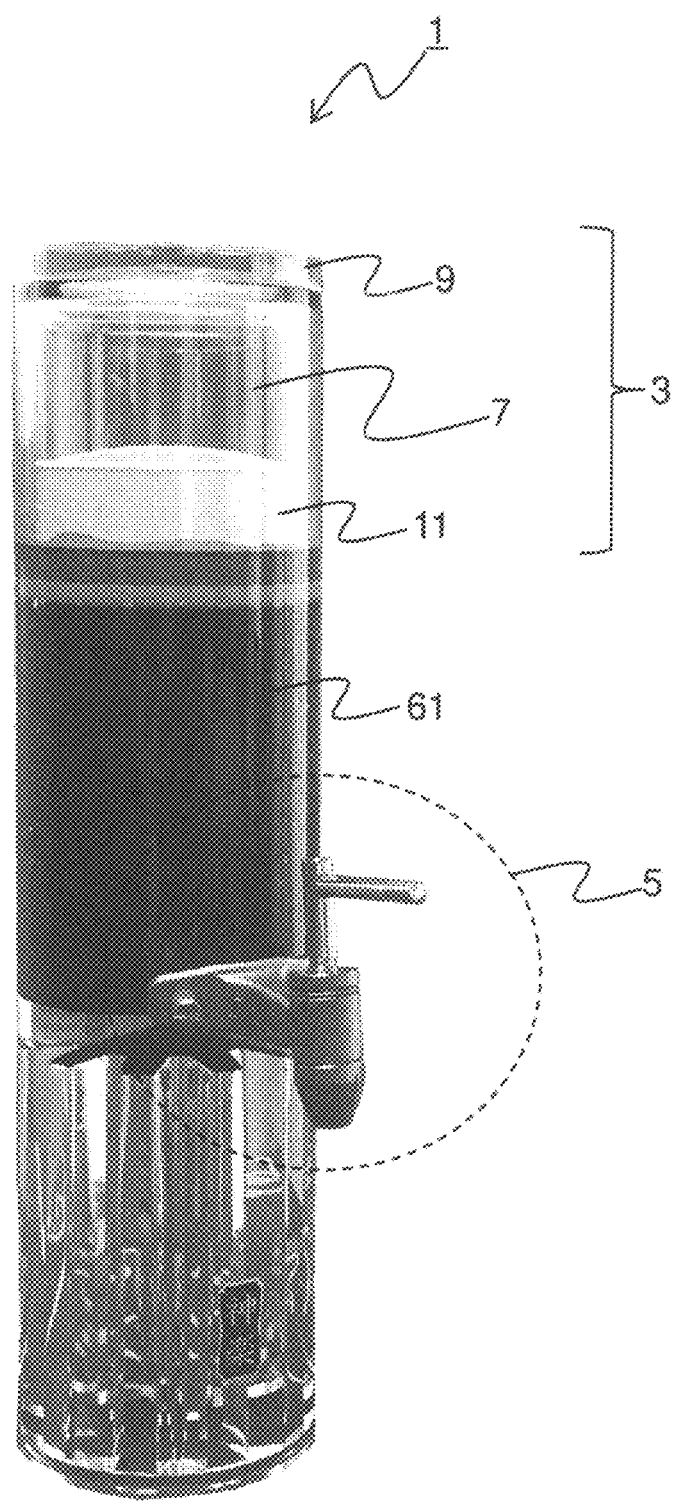
FIG. 2 is a front perspective view showing an example of a dispenser related to the present invention.

FIG. 2 is a diagram showing an example of the whole dispenser 1 related to the present invention. With reference to FIG. 2, the dispenser 1 discharges beverage 61 held by the beverage holding part 7 by the operation of a lever 15 of a user. The container part 3 holds the beverage 61 in the cylindrical beverage holding part 7. The upper lid 9 prevents air, dust, etc. from getting into the beverage holding part 7 at the upper part of the beverage holding part 7. The drop lid 11 is floated on the beverage 61 inside the beverage holding part 7 and discharges the beverage 61 to the cock part 5 by its own weight. The outer diameter of the drop lid 11 is designed according to the inner diameter of the beverage holding part 7, and the drop lid 11 is slid inside of the beverage holding part 7 while the beverage 61 is discharged. Therefore, the beverage 61 held in the beverage holding part 7 is hardly exposed to the outside air, and oxidation is suppressed.

Figure 3:
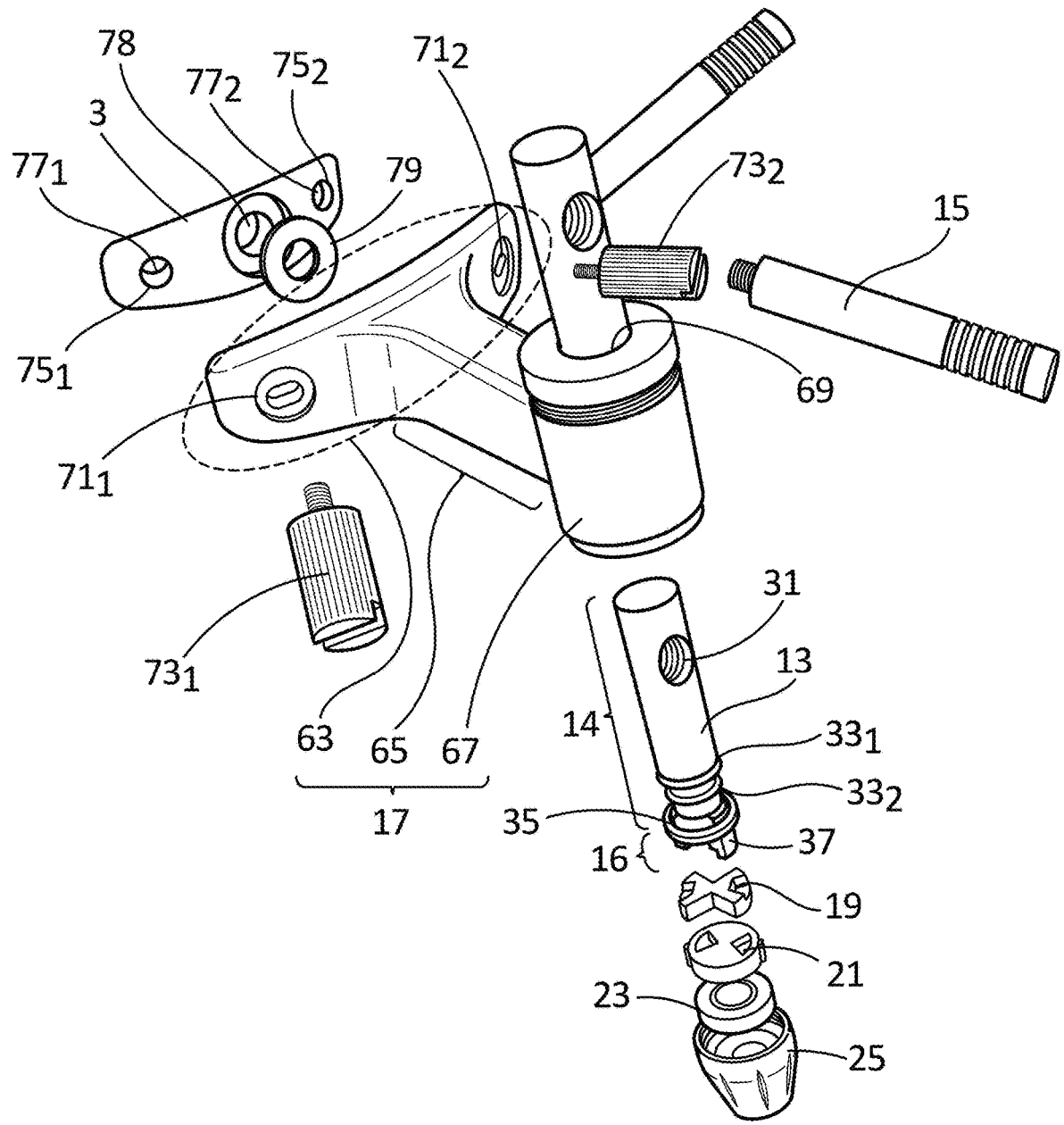
FIG. 3 is a front perspective view showing an example of a structure of a cock part related to the present invention.

The cock part 5 controls the discharge of the beverage from the beverage holding part 7. FIG. 3 is a diagram showing an example of the structure of the cock part 5 related to the present invention divided into pieces to be easily understood. Referring to FIG. 3, a cock part 5 is described below.

The rotary shaft 13 is rotated to control the opening and closing of the cock part 5. The rotary shaft 13 includes a thin shaft part 14 and an end part 16 having an outer diameter larger than that of the shaft part 14. The lever hole 31 and the bearing packing 33 are in the shaft part 14, and the guide ring 35 and the leg part 37 are at the end part 16. The lever 15 is fixed to the lever hole 31 of the rotary shaft 13 and rotates around the rotary shaft 13 together with the rotary shaft 13.

Here, the opening/closing system of the lever 15 is a rotary type rather than a lift type, so that there is an advantage that the dispenser 1 is prevented from falling down when the user operates the lever 15.

The cock body 17 includes a fixing part 63, a connection part 65 (one example of a "connection pipe" in claims), and a shaft holding part 67 (one example of a "discharge pipe" in claims). The cock body 17 is fixed to the container part 3 at the fixing part 63 and holds the rotary shaft 13 penetrating through the rotary shaft hole 69 of the shaft holding part 67. The connection part 65 connects the fixing part 63 and the shaft holding part 67. The fixing part 63 is penetrated by knurled screws $73_1$ and $73_2$ at the screw holes $71_1$ and $71_2$ of the fixing part 63, respectively. And the fixing part 63 is fixed to the screw holes $77_1$ and $77_2$ of the container part 3 via insert nuts $75_1$ and $75_2$. A seal packing 79 is sandwiched between the container part 3 and the cock body 17 to prevent the beverage 61 from leaking out of the container outlet 78 from which the beverage 61 is discharged from the container part 3.

The leg part 37 is brought into contact with the rotary valve 19. The rotary valve 19 is also in contact with the fixed valve 21. The fixed valve 21 is also in contact with the grooved packing 23. The grooved packing 23 is brought into contact with the cock cap 25. The cock cap 25 is fixed to the shaft holding part 67 in a screw way.

Figure 4:
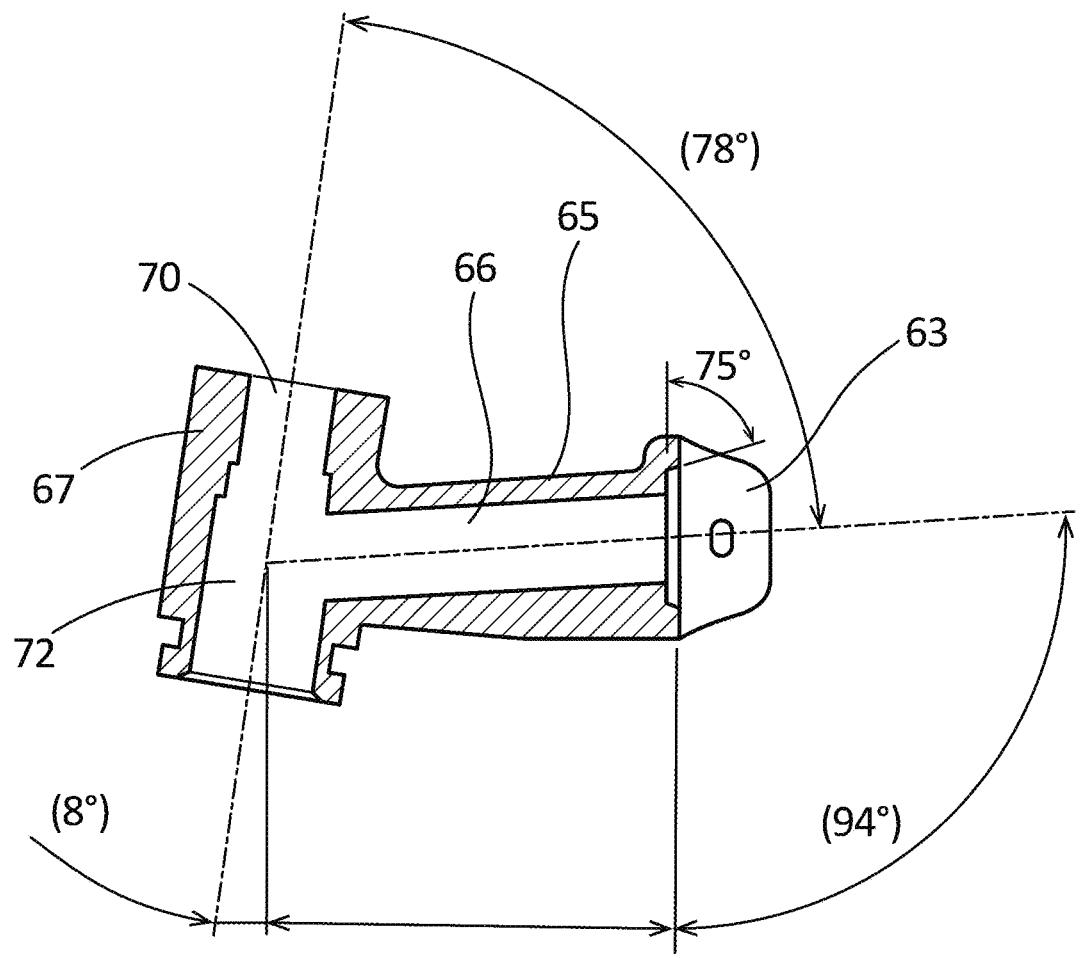
FIG. 4 is a sectional view showing an example of a cock body.

FIG. 4 is an example of a cross-sectional view of the cock body 17. The cock body 17 is described with reference to FIG. 4

The rotary shaft hole 69 is composed of a shaft hole part 70 having a narrow inner diameter and a hole end part 72 having an inner diameter larger than that of the shaft hole part 70. The shaft part 14 can be inserted into the shaft hole part 70. On the other hand, the end part 16 has a size of an outer diameter which cannot be inserted into the shaft hole part 70, though it can be inserted into the hole end part 72. When the shaft part 14 is inserted into the rotary shaft hole 69 from the side of the hole end part 72, the rotary shaft 13 is fixed with the two bearing packing $33_1$ and $33_2$, which are rubber O-rings, in contact with the inside of the shaft hole part 70. Since the two bearing packings $33_1$ and $33_2$ are provided at a fixed interval between them, the rotary shaft 13 is easily rotated, the interference is automatically controlled, and the shake of the center axis of the rotary shaft 13 can be suppressed. The guide ring 35 made of resin, harder than the bearing packing 33, becomes a cushioning material, keeping the end part 16 and the shaft hole part 70 from direct contact. The bearing packing 33 and the guide ring 35 also serve to prevent air from coming off in order to prevent the beverage 61 from flowing back.

The beverage 61 entering the cock body 17 from the container discharge port 78 is led to the hole end 72 through the connection orifice 66. When the cock is opened by the lever 15, the beverage 61 is discharged through the rotary valve 19, the fixed valve 21, the grooved packing 23, and the cock cap 25.

As shown in FIG. 4, the connection orifice 66 is inclined downward 4 degrees from the horizontal direction, from the container part 3 side toward the hole end part 72. This configuration is employed so that the beverage is not left in the path of the connection orifice 66 when the cock part 5 is in the closed state. In addition, the rotary shaft hole 69 is inclined by 8 degrees from the vertical direction away from the container part 3. This configuration is employed so that the beverage, especially wine, can be easily poured into a wine glass smoothly.

Figure 5A:
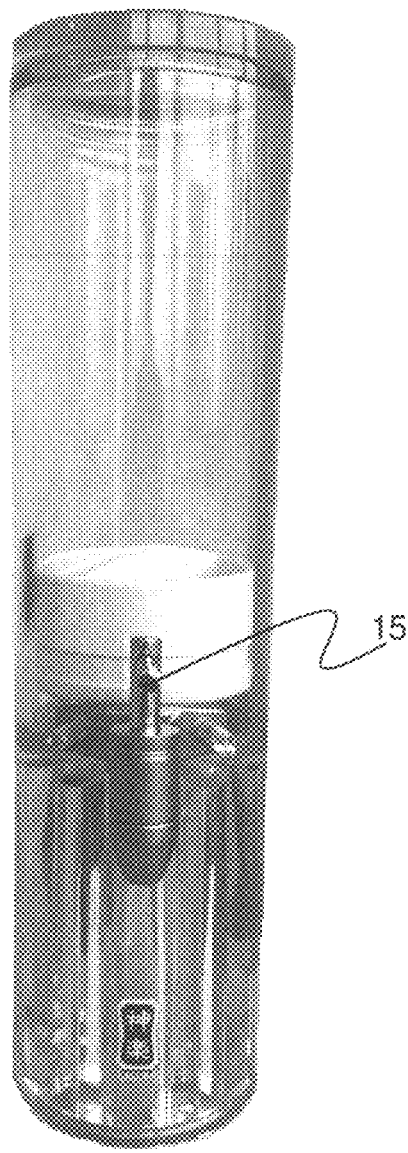
FIG. 5A is a front perspective view showing the lever of the dispenser facing the front.
Figure 5B:
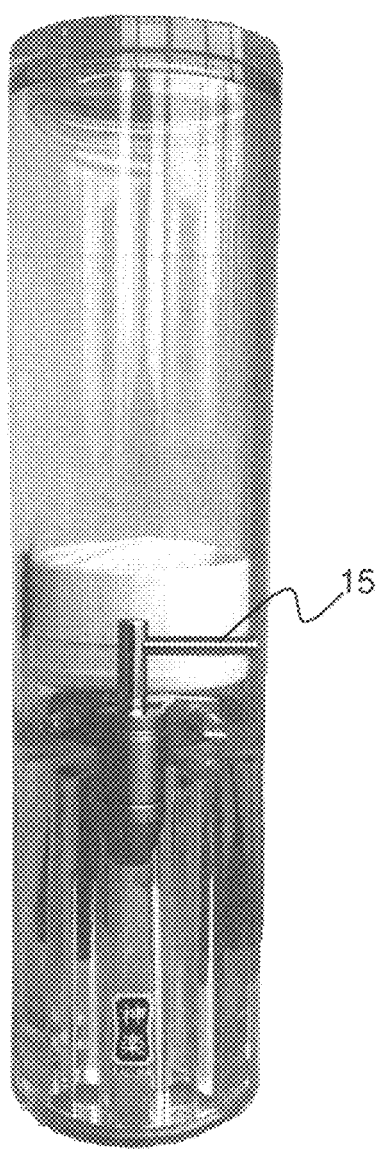
FIG. 5B is a front perspective view showing the lever oriented sideways.

Next, the action of the dispenser 1 related to the present invention will be described. FIGS. 5A and 5B are diagrams showing when the lever 15 of the dispenser 1 faces the front (5A) and the side (5B).

With reference to FIGS. 5A and 5B, the user is psychologically prompted to operate the lever 15 when the lever is directed to the front as shown in FIG. 5A, as compared with when the lever is directed sideways as shown in FIG. 5B. This means that the direction of the lever affects the user. The idea is along with affordance which forms the basis of design. Therefore, when the dispenser 1 is ready to be used outside the refrigerator or the like, it is preferable that the lever is directed toward the user (front) as shown in FIG. 5A when the cock part 5 is in the closed state.

On the other hand, when the dispenser 1 is housed in a refrigerator or the like, when the lever 15 faces the front, it collides with the wall of the refrigerator, food, etc. and becomes a hindrance to the storage. Further, food or the like is damaged. Further, when the lever collides with the food or the like and rotates in the refrigerator, the beverage can be spilled into the refrigerator. Therefore, when the dispenser 1 is housed in a refrigerator or the like, it is preferable that the lever is directed sideways as shown in FIG. 5B when the cock part 5 is in the closed state.

As described above, it is preferable that the direction of the lever 15 in the closed state is different between the use time and the storage time. As a result, the present inventor thought of a plurality of fixing positions of the fixed valve 21 provided in the present invention. The details are set forth below with reference to FIGS. 6A-6E and 7A-7D.

Figure 6A:
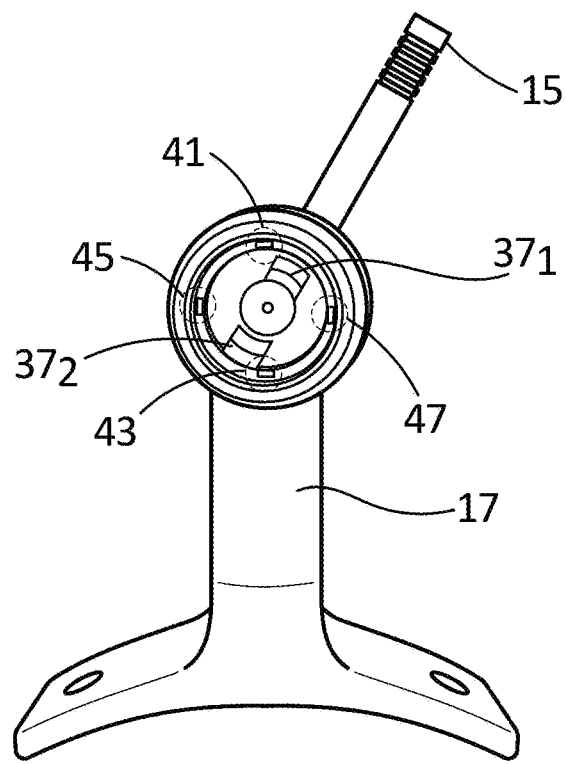
FIG. 6A is a bottom perspective view showing an example of the cock body with the rotary shaft inserted into the rotary shaft hole and the lever also attached, viewed from the side of the hole end part.
Figure 6B:
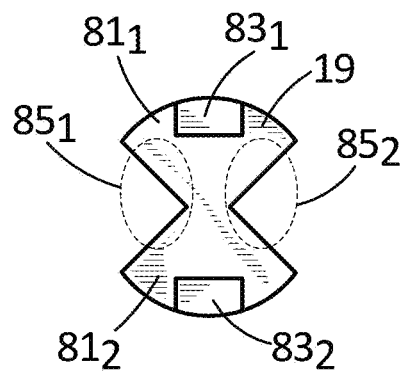
FIG. 6B is a top view showing an example of the rotary valve in contact with the leg part.
Figure 6C:
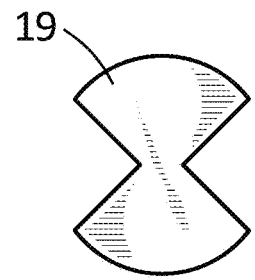
FIG. 6C is a bottom view showing an example of the rotary valve in contact with the fixed valve.
Figure 6D:
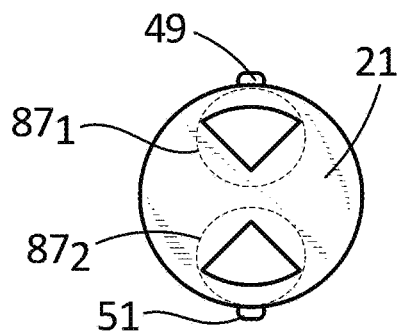
FIG. 6D is a top view showing an example of the fixed valve in contact with the rotary valve.
Figure 6E:
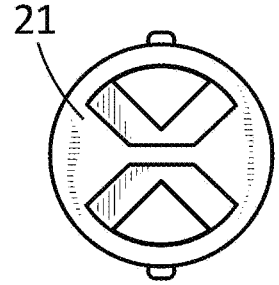
FIG. 6E is a bottom view showing an example of the fixed valve in contact with the grooved packing.

FIGS. 6A-6E are diagrams showing an example of the contact parts of the cock body 17, the rotary valve 19 and the fixed valve 21. FIG. 6A shows an example of the cock body 17 with the rotary shaft 13 inserted into the rotary shaft hole 69 and the lever 15 is also attached, viewed from the side of the hole end part 72. FIG. 6B shows an example of the rotary valve 19 viewed from the side in contact with the leg part 37. FIG. 6C shows an example of the rotary valve 19 viewed from the side in contact with the fixed valve 21. FIG. 6D shows an example of the fixed valve 21 viewed from the side in contact with the rotary valve 19. And FIG. 6E shows an example of the fixed valve 21 viewed from the side in contact with the grooved packing 23.

Referring to FIGS. 6A-6E, how the rotary valve 19 and the fixed valve 21 are in contact with the cock body 17 will be described. Referring to FIG. 6A, the first groove 41, the second groove 43, the third groove 45, and the fourth groove 47 are provided in the hole end 72. The first groove 41 and the second groove 43 are positioned facing each other across the rotation center. And the third groove 45 and the fourth groove 47 are positioned facing each other across the rotation center. The first groove 41, the fourth groove 47, the second groove 43, and the third groove 45 are sequentially provided separately in the positions rotated clockwise by 90 degrees from the neighboring groove around the rotation center.

Referring to FIG. 6B, the rotary valve 19 has two fan-shaped rotary fan parts 81 in two-plane symmetry. And each of the rotary fan parts $81_1$ and $81_2$ has rotary grooves $83_1$ and $83_2$, respectively. The rotary fan parts $81_1$ and $81_2$ have fan-shaped interspaces $85_1$ and $85_2$ (an example of a "rotation interspace" in claims) between the rotary fan parts $81_1$ and $81_2$. The rotary valve 19, with the rotary groove 83 fitting the leg part 37, rotates with the movement of the rotating shaft 13 when the lever 15 is rotated.

On the other hand, with reference to FIG. 6D, the fixed valve 21 has a fixed hole 871 and a fixed hole 872 (an example of a "fixed hole" in claims) which are fan-shaped holes, and a first lug part 49 and a second lug part 51. The first lug part 49 and the second lug part 51 are set in the first groove 41 and the second groove 43, or are set in the third groove 45 and the fourth groove 47. Therefore, even if the lever 15 is rotated, the fixed valve 21 is fixed and not rotated.

The cock body 17 is made of stainless steel, and the rotary valve 19 and the fixed valve 21 are made of ceramic. Therefore, even if the beverage 61 is strongly acidic like wine, the member of the cock part 5 is not melted in the beverage 61. It is also believed that the effect of the member of the cock part 5 on the liquid is reduced. Depending on the material, the valves are rubbed against each other to leave fine powder, and the risk of elution of the environmental hormone, etc. is concerned, but there is no concern if the members are made of ceramic. Taking the regulation of Europe or the like into consideration, the rotary valve 19 and the fixed valve 21 may be made of alloy which does not elute lead or cadmium in addition to stainless steel such as stainless steel 18-8 or the like.

Figure 7A:
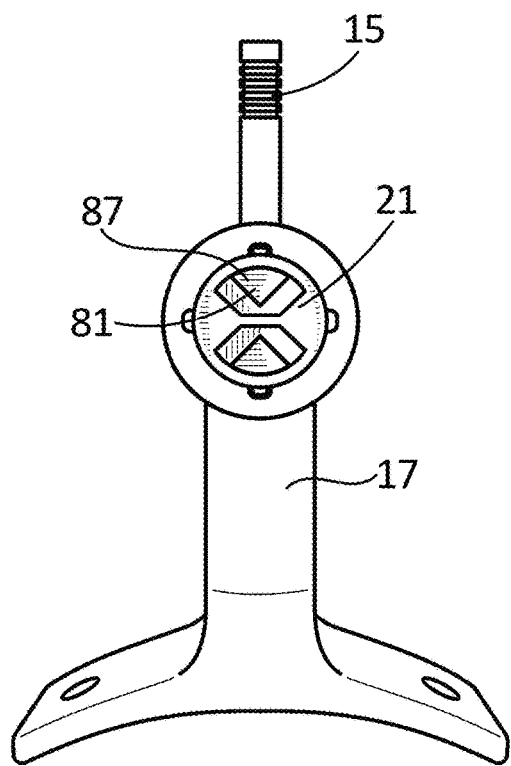
FIGS. 7A-7D show relationships between the fixed positions of the fixed valve and the directions of the lever in the cock part related to the present invention.
Figure 7B:
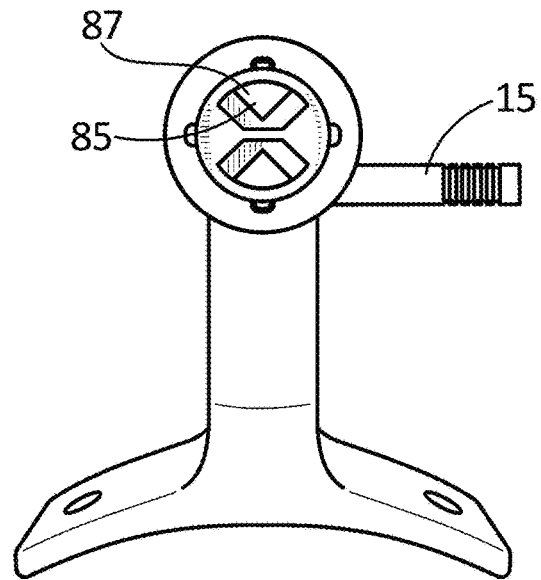
Figure 7C:
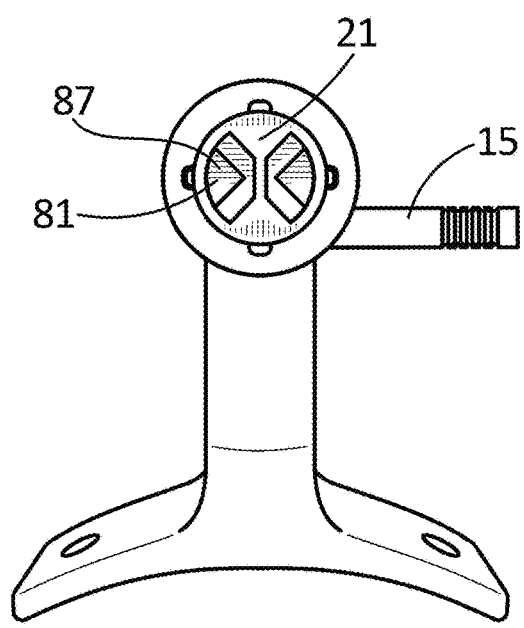
Figure 7D:
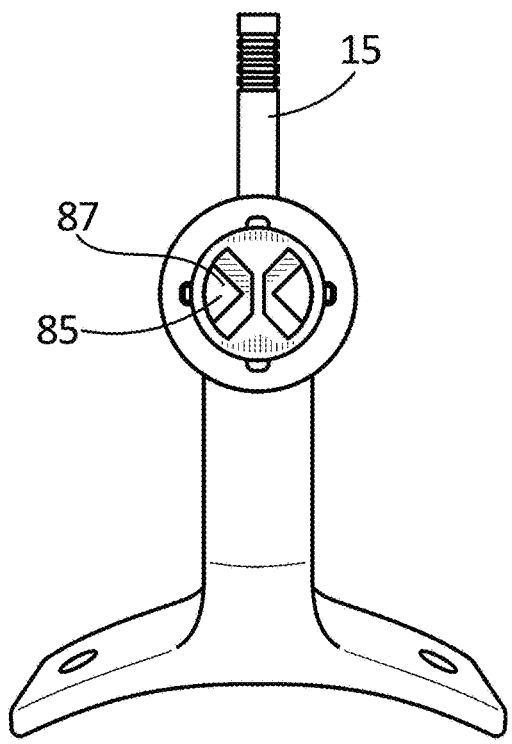

Further, with reference to FIGS. 7A-7D, the relation between the opening/closing state of the cock part 5 and the direction of the lever is described. FIGS. 7A-7D are diagrams showing an example of the relationship between the fixed positions of the fixed valve 21 and the directions of the lever 15 in the cock part 5 related to the present invention. FIG. 7A shows the closing state with the lever 15 turned toward the front. FIG. 7B shows the opening state with the lever 15 turned sideways. FIG. 7C shows the closing state with the lever 15 turned sideways. FIG. 7D shows the opening state with the lever 15 turned toward the front. The dispenser 1 discharges the beverage 61 by rotating the lever 15 and overlapping the position of the rotary interspaces 85 and the fixed holes 87.

First, the state in which the fixed valve 21 is fixed in the position where the first lug 49 and the second lug 51 of the fixed valve 21 are set in the first groove 41 and the second groove 43, respectively (one example of a "first position" in claims) is described. At this time, with reference to FIG. 7A, when the lever 15 faces the front, the rotary fan parts 81 and the fixed holes 87 are overlapped and in the closing state. Then, with reference to FIG. 7B, when the lever 15 is turned sideways, the rotary interspaces 85 and the fixed holes 87 are overlapped and in the opening state. That is, when the dispenser 1 is used, it is preferable to set the fixed valve 21 in the first position.

Next, the state in which the fixed valve 21 is fixed in the position where the first lug 49 and the second lug 51 of the fixed valve 21 are set in the third groove 45 and the fourth groove 47, respectively (one example of a "second position" in claims) is described. At this time, with reference to FIG. 7C, when the lever 15 is turned sideways, the rotary fan parts 81 and the fixed holes 87 are overlapped and in the closing state. Then, with reference to FIG. 7D, when the lever 15 faces the front, the rotary interspaces 85 and the fixed holes 87 are overlapped and in the opening state. That is, when the dispenser 1 is housed, it is preferable to set the fixed valve 21 to the second position.

As described above, the fixed valve 21 can be fixed at two fixing positions, which are the corresponding positions overlapping when the fixed valve 21 is rotated around the rotary shaft 13. Therefore, it is made possible to have the dispenser in the closing state with the lever 15 at different positions between when it is used and when it is stored. Thus, the dispenser 1 related to the present invention can keep the lever 15 in the position which prompts the user to use the lever 15 in the closing state at the time of use. And the dispenser 1 can keep the lever 15 in the position which does not obstruct the storage in the closing state during storage. As a result, even at home where a storage space is limited, it becomes easier to enjoy the use of a full-scale dispenser.

Figure 8A:
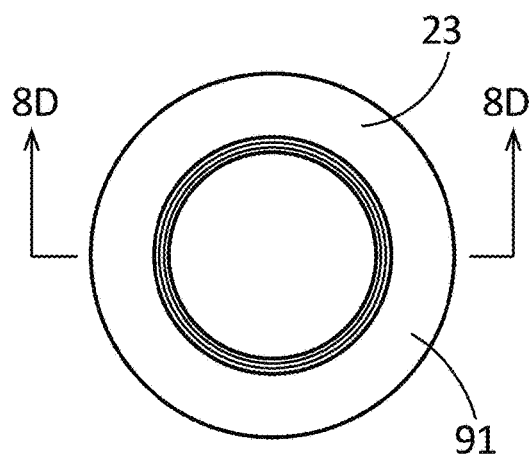
FIGS. 8A-8D show an example of a structure of a grooved packing.
Figure 8B:
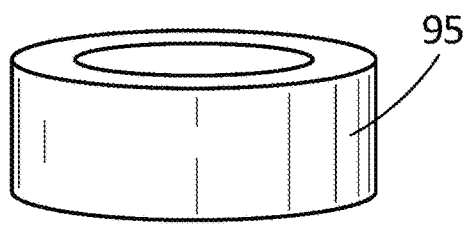
Figure 8C:
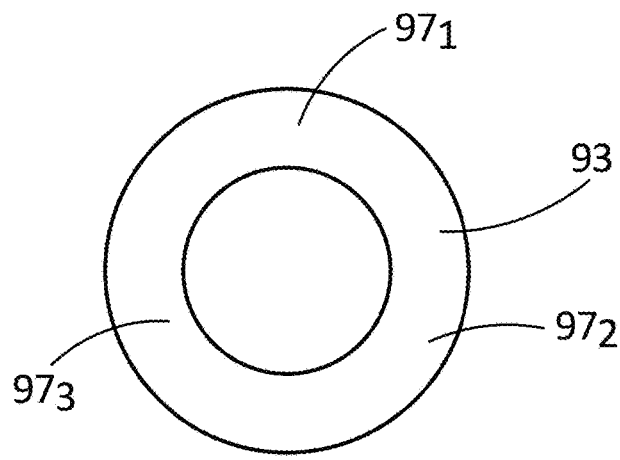
Figure 8D:
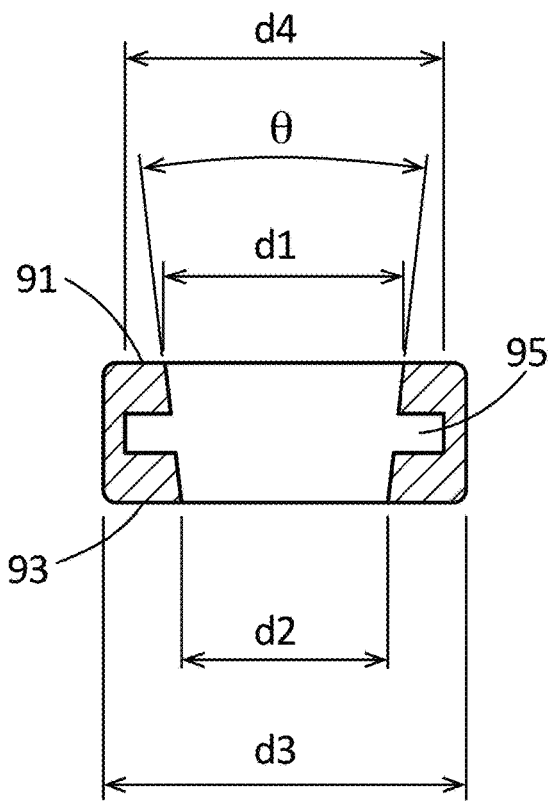

Further, the grooved packing 23 which improves the usability of the dispenser 1 is described. FIGS. 8A-8D are diagrams showing an example of the structure of the grooved packing 23. FIG. 8A shows a top view of the grooved packing 23. FIG. 8B shows a side view of the grooved packing 23. FIG. 8C shows a bottom view of the grooved packing 23. FIG. 8D shows a cross-sectional view taken along line 8D-8D of FIG. 8A.

Referring to FIG. 8, the grooved packing 23 is made of silicone rubber and has a cylindrical shape. FIG. 8A shows the grooved packing 23 viewed from the side in contact with the fixed valve 21. FIG. 8B shows the grooved packing 23 viewed from the side surface, and the front view, the right side view, the left side view, and the rear view are the same. FIG. 8C shows the grooved packing 23 viewed from the side in contact with the cock cap 25.

When the beverage is discharged from the cock part 5, the liquid pool at the cock cap 25 may cause a problem. When the liquid pool of the beverage such as wine drop as a droplet without being noticed, it may cause a tablecloth or a carpet to stain.

Therefore, as shown in FIG. 8D, an inner diameter d1 (an example of "upper inner diameter" in claims) of an upper surface 91 in contact with the fixed valve 21 is made larger than an inner diameter d2 (one example of a "lower inner diameter" in claims) of a lower surface 93 in contact with the cock cap 25. The lower surface 93 is closer to the discharge side than the upper surface 91. From the viewpoint of the outflow amount and design, the diameter (size) of the grooved packing 23 is determined to a size not to leave an air reservoir in a space between the ceramic fixed valve and the grooved packing outlet. Thus, the liquid pool can be retained in the grooved packing only by the negative pressure of the liquid. Further, a taper angle θ is applied from the inner diameter of the upper surface 91 toward the inner diameter of the lower surface 93. The taper angle is preferably 20 degrees or more. As a result, the beverage 61 is easily discharged, and after the cock part 5 is in the closing state, the liquid accumulation in the cock cap 25 can be easily prevented.

Here, the cock cap 25 has a packing storage part which stores the grooved packing 23 and a cap hole through which the beverage 61 passes and is discharged. The inner diameter of the packing storage part is matched with the outer diameter d3 of the grooved packing 23. Therefore, the beverage 61 is certainly passed through the cylinder of the grooved packing 23. Besides, the inner diameter d2 of the lower surface part 93 is made smaller than the inner diameter of the cap hole. Thus, it is easy for the beverage 61 to flow out and it is further easier to prevent the liquid from causing liquid pool at the outlet of the grooved packing 23.

In FIG. 8B, it is seen that there is an inner diameter groove 95 (one example of the "groove" in claims) which is a groove in the inner diameter direction of the grooved packing 23. The presence of the inner diameter groove 95 is clearly indicated in FIG. 8D. The inner diameter groove 95 automatically adjusts a load for rotating the rotary shaft 13. Further, since there is room for storing the beverage 61 in the inner diameter groove 95, it is possible to suppress the drop of the liquid even if the liquid is accumulated after the cock part 5 is brought into the closing state. Naturally, the inner diameter d4 of the inner diameter groove 95 is smaller than the outer diameter d3 of the grooved packing 23.

Further, as shown in FIG. 8C, the lower surface 93 is provided with three concave portions 971, 972, and 973, so that the user can easily discriminate the upper surface and the lower surface of the grooved packing 23. Similarly, as a means for discriminating the upper surface and the lower surface, the color may be given so that it can be discriminated in either one or both of the upper surface and the lower surface.

As far as the fixed valve 21 can be fixed at a plurality of positions, the number of lugs of the fixed valve may not be two, and the number of grooves of the hole end part may not be four.

The rotary valve 19 has two rotary gaps between the two rotary fan parts, but it may have other numbers of rotary fan parts and rotary interspaces. Similarly, the fixed valve 21 has two fixing holes, but may have other number of fixed holes. Further, the rotary valve may have a hole instead of an interspace, and the fixed valve may have an interspace instead of a hole. And at least one of the rotary valve and the fixed valve may have a hole and an interspace.

DESCRIPTION OF THE SYMBOLS (1) dispenser, (3) container part, (5) cock part, (7) beverage holding part, (9) upper lid, (11) drop lid, (13) rotary shaft, (15) lever, (16) end part, (17) cock body, (19) rotary valve, (21) fixed valve, (23) grooved packing, (25) cock cap, (31) lever hole, (33) bearing packing, (35) guide ring, (37) leg part, (41) first groove, (43) second groove (45) third groove, (47) fourth groove, (49) first lug part (51) second lug part, (61) beverage, (63) fixing part, (65) connection part, (67) shaft holding part, (69) rotary shaft hole, (70) shaft hole part, (71) screw hole, (72) hole end part, (73) knurled screw, (75) insert nut, (77) screw hole, (79) sealing packing, (81) rotary fan part, (83) rotary groove, (85) rotary interspace, (87) fixed hole, (91) upper surface, (93) bottom surface, (95) inner diameter groove, (97) concave portion

The invention claimed is:

1. A dispenser for discharging beverage, the dispenser comprising:
   a container part configured to hold the beverage;
   a cock configured to control discharge of the beverage;
   a lever connected to a rotary shaft of the cock;
   a rotary valve connected to the rotary shaft and defining a rotary interspace configured to rotate together with the rotary shaft; and
   a fixed valve fixed to a cock body of the cock and defining a fixed hole configured to not move even when the rotary shaft is rotated;
   wherein the dispenser is configured to be stored in a refrigerator;
   wherein the dispenser is configured to discharge the beverage when the lever is rotated to overlap a position of the rotary interspace and the fixed hole;
   wherein the cock is configured to fix the fixed valve at either of a first position and a second position, the second position being different from the first position;
   wherein the cock further has a cylindrical packing inside; and wherein the packing defines a lower inner diameter at a lower part near a discharge side and an upper inner diameter at an upper part far from the discharge side, and the lower inner diameter is smaller than the upper inner diameter;
   wherein the packing defines a groove in an inner diameter direction between the upper part and the lower part.

2. The dispenser according to claim 1, wherein the second position is in a different rotational position than the first position with respect to an axis of the rotary shaft.

3. The dispenser according to claim 1,
   wherein the fixed valve has a first lug part and a second lug part; and
   wherein the cock body defines a first groove, a second groove, a third groove, and a fourth groove; and
   wherein the cock body fixes the fixed valve in the first position by fixing the first lug part and the second lug part at the first groove and the second groove, respectively; or,
   wherein the cock body fixes the fixed valve in the second position by fixing the first lug part and the second lug part at the third groove and the fourth groove, respectively.

4. The dispenser according to claim 1, wherein a direction in which the cock discharges the beverage is fixed so as to be inclined by 3 degrees or more and 25 degrees or less with respect to the vertical direction when the dispenser is horizontally placed.

5. The dispenser according to claim 1,
   wherein the cock body includes:
   a connection pipe connected to a container part configured to contain the beverage; and
   a discharge pipe connected to the connection pipe and holding the rotary shaft;
   wherein, when the dispenser is horizontally placed, an end of the connection pipe, connected to the container, is fixed at a position higher than an end of the connection pipe connected to the discharge pipe.

6. The dispenser according to claim 1, wherein the dispenser is a wine dispenser.

7. The dispenser according to claim 1, wherein the refrigerator is a home refrigerator.

8. A cock for discharging beverage from a dispenser, the cock comprising:
   a lever connected to a rotary shaft of the cock;

a fixed valve fixed to a cock body of the cock and defining a fixed hole;

a rotary valve connected to the rotary shaft and defining a rotary interspace; and a cylindrical packing positioned inside the cock;

wherein the dispenser is configured to discharge the beverage when the lever is rotated to overlap a position of the rotary interspace and the fixed hole;

wherein the cock is configured to fix the fixed valve at either of a first position and a second position, the second position being different from the first position;

wherein the packing defines a lower inner diameter at a lower part near discharge side and an upper inner diameter at an upper part far from the discharge side, and the lower inner diameter is smaller than the upper inner diameter; and wherein the packing defines a groove in an inner diameter direction between the upper part and the lower part.

* * * * *